United States Patent [19]

Cho

[11] Patent Number: 5,544,231
[45] Date of Patent: Aug. 6, 1996

[54] CONVERSATION RECORDING/PLAYBACK METHOD IN A KEY PHONE SYSTEM

[75] Inventor: Seung-Hwan Cho, Seoul, Rep. of Korea

[73] Assignee: SamSung Electronics Co., Ltd., Suwon, Rep. of Korea

[21] Appl. No.: 233,417

[22] Filed: Apr. 28, 1994

[30] Foreign Application Priority Data

May 31, 1993 [KR] Rep. of Korea .................. 9490/1993

[51] Int. Cl.⁶ ....................................................... H04M 1/64
[52] U.S. Cl. ........................... 379/67; 379/196; 379/156
[58] Field of Search .................................. 379/67, 88, 89, 379/34, 196, 203, 204, 70, 75, 156, 157, 158, 165

[56] References Cited

U.S. PATENT DOCUMENTS

| 2,340,160 | 1/1944 | Deventer. | |
|---|---|---|---|
| 4,317,007 | 2/1982 | Harrison | 379/34 |
| 4,625,081 | 11/1986 | Lotito | 379/67 |
| 4,813,070 | 3/1989 | Humphreys | 379/213 |
| 4,817,127 | 3/1989 | Chamberlin et al. | 379/67 |
| 4,893,334 | 1/1990 | Parnello | 379/157 |
| 4,903,289 | 2/1990 | Hashimoto | 379/67 |
| 4,975,896 | 12/1990 | D'Agosto | 379/75 |
| 5,113,429 | 5/1992 | Morley | 379/88 |
| 5,125,023 | 6/1992 | Morduch | 379/67 |
| 5,136,648 | 8/1992 | Olson | 379/67 |
| 5,249,217 | 9/1993 | Lee | 379/61 |

*Primary Examiner*—Jeffery Hofsass
*Assistant Examiner*—Fan Tsang
*Attorney, Agent, or Firm*—Robert E. Bushnell, Esq.

[57] ABSTRACT

A method of recording and playing back a telephone conversation in a key phone system. To initiate recording during a telephone conversation, a subscriber enters a start recording code by depressing predetermined buttons/keys on his telephone. The conversation is then recorded by a conversation recording unit until the initiating subscriber either enters an end recording code or hangs up the telephone. The recorded conversation and a recording time are then stored to a memory portion. To playback the recorded conversation, the subscriber enters a playback code on his telephone. The recorded conversation is played back to the subscriber until either its recording time has elapsed or the subscriber hangs up his telephone.

22 Claims, 5 Drawing Sheets

CONVERSATION RECORDING/PLAYBACK METHOD IN A KEY PHONE SYSTEM

BACKGROUND OF THE INVENTION

The present invention relates to a key phone system, and more particularly to a conversation recording and playback method and circuit for recording a conversation between telephone subscribers and playing the recorded conversation back to a designated subscriber.

Nowadays, telephones provided with peripheral accessories such as, by way of example, an automatic answering machine, voice mailing system (VMS), or audio response system (ARS), provide the service of receiving and recording a voice message from a user or subscriber, and playing the recorded voice message back to the user or subscriber.

Korean Patent No. 58830 entitled Auto Transition Apparatus In A Keyphone System issued 27 Jan. 1993 mentions a system wherein an incoming call from a central office line is connected to a subscriber without passing through a switching board through use of a voice message record and playback function. The system utilizes a pre-recorded vocal guide message that is played back and then sent to the central office line when a call to a subscriber is entered from the central office line. If the central office subscriber hearing the voice guide message enters an extension number previously assigned to the subscriber being called, the key phone system recognizes the entered extension number and supplies a ring signal to the corresponding subscriber, thereby completing the call.

If a subscriber using the system enters into a contract or conducts negotiations over the telephone however; a recorded copy of the conversation is sometimes needed to confirm the existence and/or the substance of the conversation after its completion. I have determined that a telephone system equipped with such peripheral features as an automatic answering machine, VMS, ARS, or the system disclosed in Korean Patent No. 58830 is unable to perform such a function and therefore, a subscriber can not record and playback a telephone conversation between two subscribers.

One concept for recording and playing back a telephone conversation between subscribers has been advanced before. In 1944, U.S. Pat. No. 2,340,160 entitled Private Branch Exchange Telephone System Employing Phonographs issued to Van Deventer for a system utilizing phonographs to record telephone conversations. It is my opinion however, that such a system is cumbersome and inconvenient, and is outdated and unreliable. Today's sophisticated electronics and advanced recording media render that concept entirely obsolete.

A more recent attempt to provide a telephone conversation recording system is found in U.S. Pat. No. 4,813,070 entitled Telephone Intercept System issued to Humphreys et al. on 14 Mar. 1989. In this effort however, the conversation being recorded is between a calling subscriber and an intercept operator, rather than another subscriber. Accordingly, this system suffers from the deficiency of not being suitable for recording a telephone conversation between two subscribers.

SUMMARY OF THE INVENTION

Accordingly, it is an object of the present invention to provide an improved telephone recording method and apparatus.

It is also an object to provide a telephone conversation recording method and apparatus that can record a telephone conversation between telephone subscribers.

It is another object to provide a telephone conversation playback method and apparatus that can reproduce a previously recorded telephone conversation, providing the recorded conversation to a designated subscriber.

It is still another object of the present invention to provide a telephone conversation recording and playback method, and apparatus, that both records and reproduces a telephone conversation between subscribers.

It is yet another object of the present invention to provide a telephone conversation recording and playback method and apparatus which enables a subscriber to easily and conveniently record and reproduce a recorded telephone conversation.

It is a further object of the present invention to provide a telephone conversation reproduction method and apparatus which limits a subscriber's access to a previously recorded telephone conversation.

It is still a further object of the present invention to provide a telephone conversation recording and playback method and apparatus that can be easily incorporated into a general telephone system.

These and other objects may be achieved according to the principles of the present invention with a conversation recording method and a key phone system using a timer circuit for generating time data indicative of a current time, a conference circuit for establishing a conference call among three parties, a conversation recording unit for storing voice data and reproducing the stored voice data, and a memory. A conference mode is established between an initiating subscriber who has entered a start-recording code, a call-opposite subscriber who is speaking with the initiating subscriber on a telephone, and the conversation recording unit. The conference mode is established in response to entry of the start-recording code by the initiating subscriber. The conversation between the initiating subscriber and the call-opposite subscriber is recorded and stored. Recording of the conversation is terminated in response to an end-recording code entered by the initiating subscriber, a recording time indicative of a time duration of the recorded conversation is also stored and then the conference mode is terminated.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
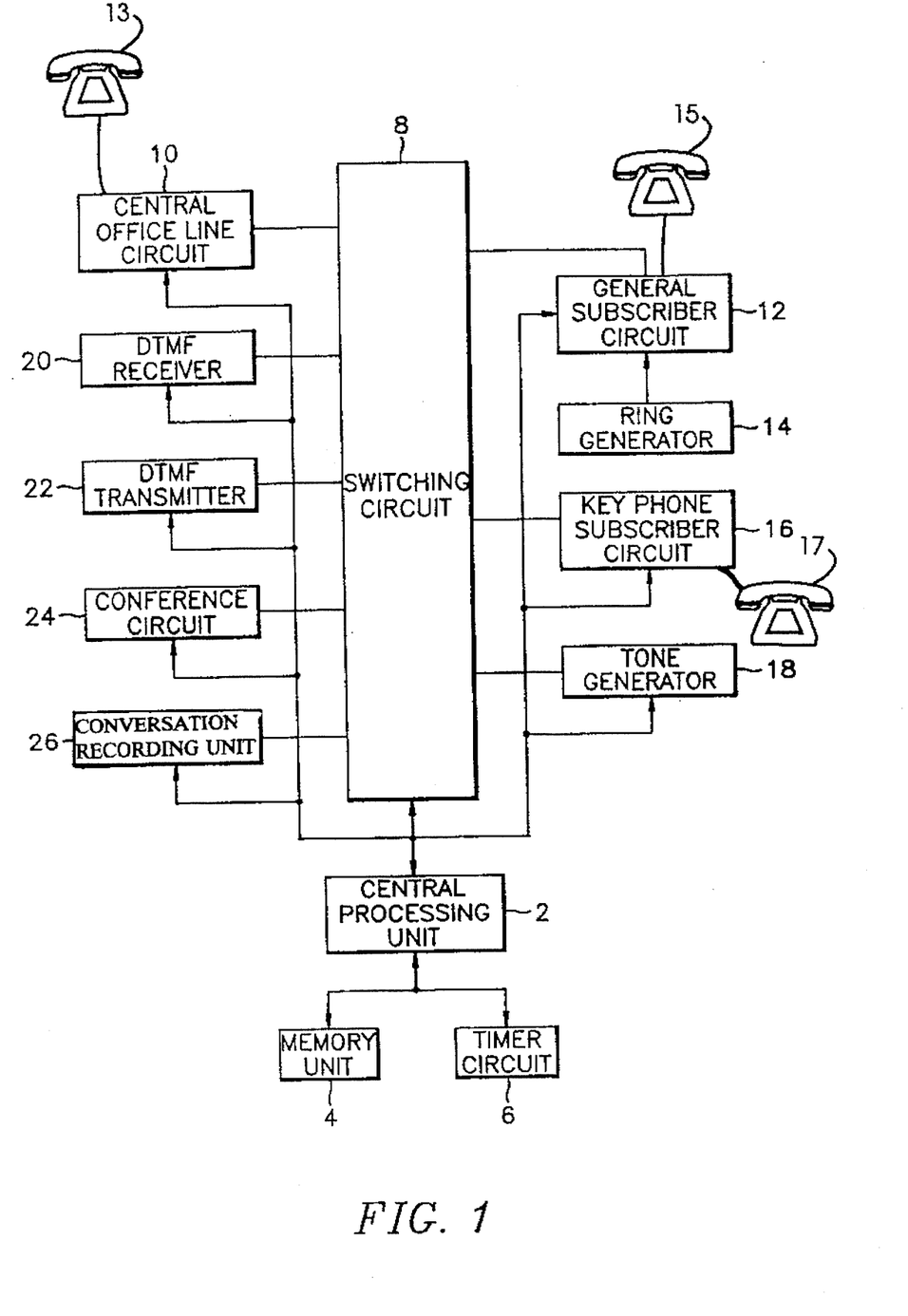
FIG. 1 is a block diagram of a key phone system constructed according to the principles of the present invention.

Turning now to the drawings, FIG. 1 shows a block diagram of a general key phone system constructed according to the principles of the present invention. In FIG. 1, central processing unit 2 controls call switching operations and generally functions to control various components of key phone system, thus providing a variety of services to a system user. Memory unit 4 stores a program that enables central processing unit 2 to perform call processing and various selected other system functions. Memory unit 4 also temporarily stores data that is processed by central processing unit 2. Timer circuit 6 is an integrated circuit on a single chip that provides time data indicative of a current time to central processing unit 2. Switching circuit 8 switches various tones and voice data under the control of central processing unit 2. Central office line circuit 10 accommodates a central office line under the control of central processing unit 2 to form a central office line call loop. Deskset telephones 13 of subscribers may be connected to one another via central office line circuit 10 under the control of switching circuit 8. Central office line circuit 10 also serves as an interface between the central office line and the switching circuit 8.

A general subscriber circuit 12 supplies a current call to the telephone 15 of a subscriber, and also acts as an interface between the telephone and the switching circuit 8, under the control of the central processing unit 2. A ring generator 14 generates a ring signal that is supplied to a subscriber's telephone line through the general subscriber circuit 12. A key phone subscriber circuit 16 transmits and receives various data to and from a key phone 17 of a subscriber, selectively connects key phone 17 to an extended line or to central office line circuit 10, supplies power to the key phone, and also acts as an interface between key phone 17 and the switching circuit 8, under the control of the central processing unit 2. Tone generator 18 generates various tone signals that are supplied to the switching circuit 8 under the control of the central processing unit 2. Dual tone multi-frequency (hereinafter "DTMF") receiver 20 is connected to switching circuit 8. DTMF receiver 20 analyzes a multi frequency code (hereinafter "MFC") signal generated from the telephone of a subscriber. DTMF transmitter 22 generates the MFC signal and supplies the generated MFC signal to switching circuit 8, under the control of the central processing unit 2. Conference circuit 24 mixes voice data supplied through switching circuit 8 under the control of the central processing unit 2, so that a conference call can be made. Conversation recording unit 26 stores voice data entered through switching circuit 8 and reproduces the stored voice data supplied to switching circuit 8 under the control of central processing unit 2.

The key phone system illustrated in FIG. 1 may be constructed by for example, adding timer circuit 6 and conversation recording unit 26 to a general key phone system. In view of the above disclosure and the details that follow, a detailed description of the general operation of a conventional key phone system is omitted.

Figure 2:
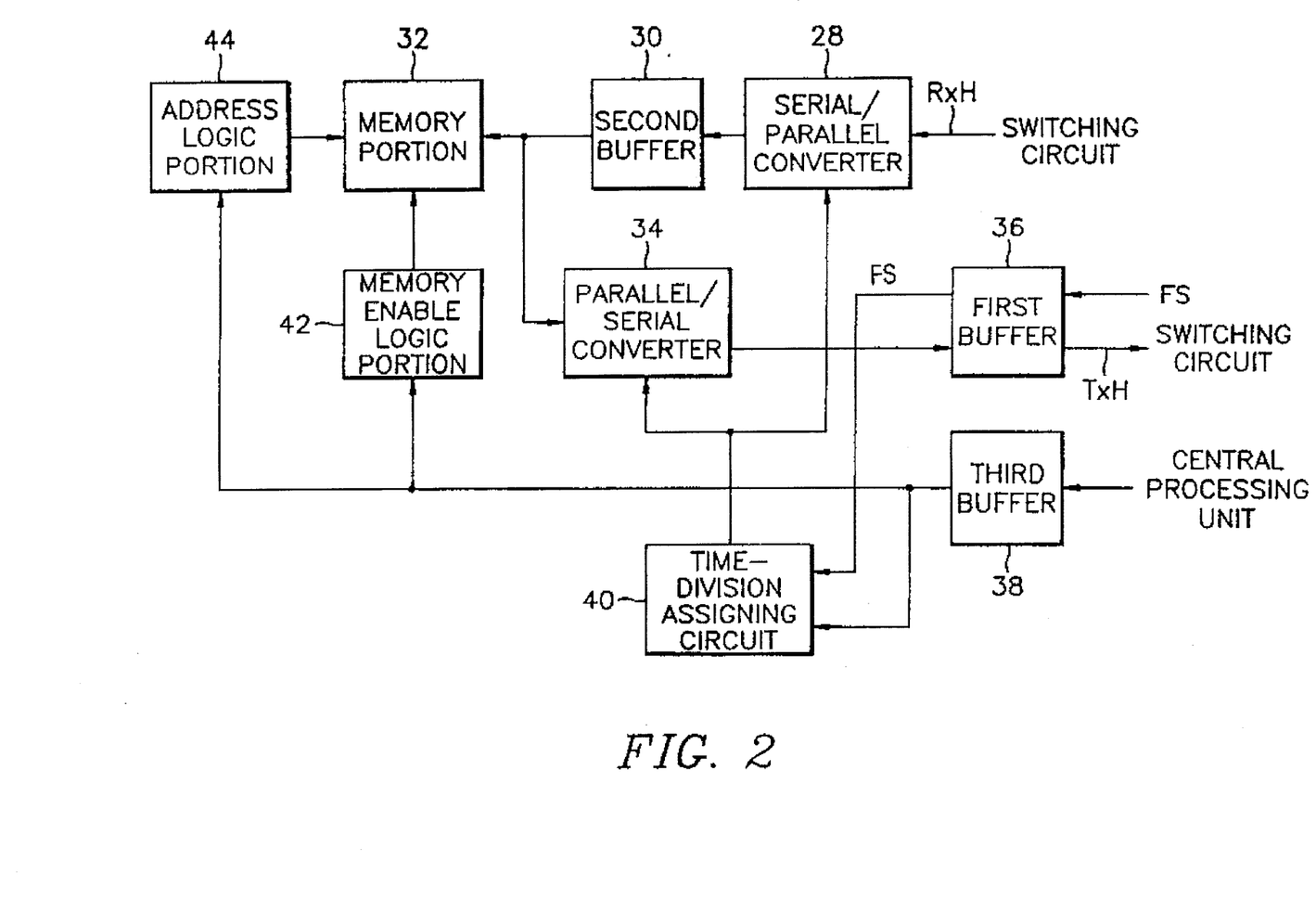
FIG. 2 is a detailed block diagram of the conversation recording unit shown in FIG. 1.

Referring to FIG. 2, a detailed block diagram of conversation recording unit 26 shown in FIG. 1 is illustrated. In FIG. 2, a serial-to-parallel converter 28 converts serial voice data from switching circuit 8 through a highway receiving terminal R×H, into parallel data. The converted parallel voice data is then supplied to a second buffer 30. At this time, the voice data is PCM voice data. Second buffer 30 buffers the converted parallel voice data from serial-to-parallel converter 28, and supplies the buffered data to memory portion 32. Memory portion 32, which is a voice memory, stores voice data from second buffer 30, and then supplies the stored voice data to parallel-to-serial converter 34. Parallel-to-serial converter 34 serially converts the voice data supplied from memory portion 32, and supplies the serial-converted data to first buffer 36. First buffer 36 receives the serially converted voice data from parallel-to-serial converter 34 and supplies the serially converted voice data to switching circuit 8 through a highway transmitting terminal T×H. First buffer 36 also receives a frame synchronizing signal FS from a signal generator (not shown) of the key phone system and, in turn, supplies frame synchronizing signal FS to a time-division assigning circuit 40.

A third buffer 38 receives an address signal and a control signal from central processing unit 2, and supplies the address signal and the control signal to the time-division assigning circuit 40, a memory enable logic portion 42, and an address logic portion 44. Time-division assigning circuit 40 assigns time slots for the voice data transferred between serial/parallel converter 28 and parallel/serial converter 34. This assignment of time slots is performed in response to the frame synchronizing signal FS received through first buffer 36, and further in response to address and control signals received from central processing unit 2 through third buffer 38. The time-division assigning circuit 40 utilizes a time slot assignment circuit (hereinafter "TSAC") such as the TP3155 model made by U.S. National Semiconductor Co. The memory enable logic portion 42 selectively enables read or write operations of memory portion 32 in response to the address and control signals received from central processing unit 2 through third buffer 38. Address logic portion 44 generates addresses for the reading and writing operations of memory portion 32, by sequentially incrementing portions of memory portion 32 that follow a designated starting address, in response to the address and control signals supplied from central processing unit 2. Address logic portion 44 also supplies the address generated to memory portion 32.

An earlier version of conversation recording unit 26 is shown in FIG. 2 of aforementioned Korean Patent No. 58830. A general description of this component is given in the detailed description portion of Korean Patent No. 58830. For purposes of comparison, note that the coder-decoder, dual tone multiple frequency receiver, fourth buffer and tone check portion shown in FIG. 2 of Korean Patent No. 58830 are not used in the present invention, and have therefore been omitted from the illustrations set forth in the drawings of the instant application.

Figure 3:
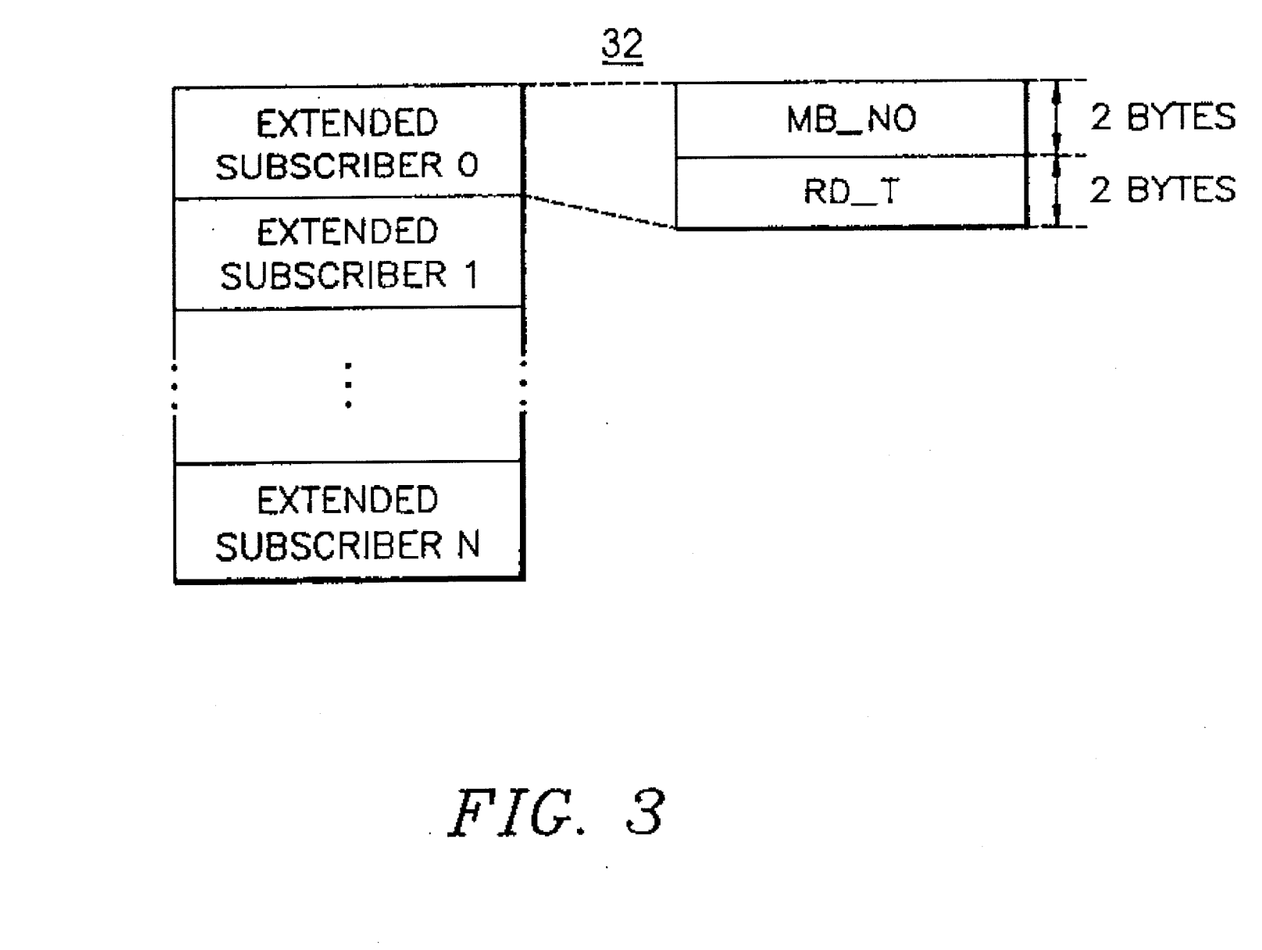
FIG. 3 shows a memory map used to perform the recording and playback method of the present invention.

FIG. 3 is a map showing the structure of memory portion 32 in the present invention. Memory portion 32 has a mail box register MB_NO and a recording time register RD_T corresponding to each subscriber. Registers like MB_NO and RD_ T, shown in FIG. 3, are formed by dividing memory portion 32 into sub-memory units having a predetermined storage capacity, and assigning a separate mail box number to each sub-memory unit and its corresponding recording time register. The recording time register RD_T stores a value representing the time duration of the conversation recorded in the corresponding mail box register. It is assumed that the initial values of mail box register MB_NO and record time register RD_T are set to "FFFF". Accordingly, when a given pair of registers are empty (i.e. contain no conversation data), mail box register MB_NO and record time register RD_T of that pair are set to "FFFF".

Figure 4:
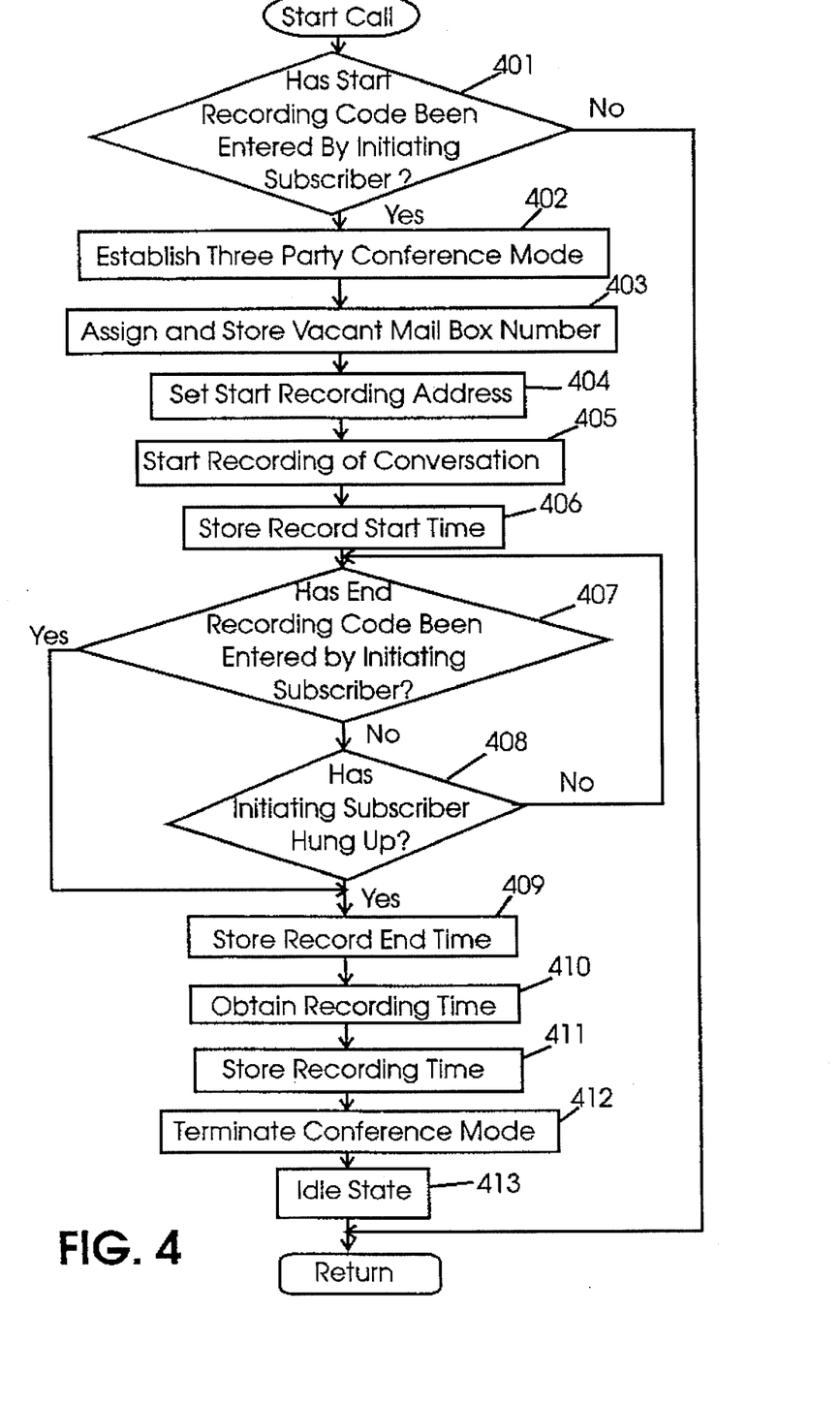
FIG. 4 is a flow chart illustrating the recording of a conversation according to the principles of the present invention.

FIG. 4 is a flow chart illustrating one process for recording a conversation according to the principles of the present invention. Hereinafter, the conversation recording operation represented by the flow chart of FIG. 4 will be described in detail with reference to FIGS. 1 through 3.

When the phone system of a first subscriber 17 is connected to a key phone subscriber circuit 16, the subscriber is able to record a telephone conversation between himself and a second subscriber utilizing the same key phone subscriber circuit 16, or between himself and a third subscriber utilizing central office line circuit 10. To initiate this process, the first subscriber inputs a start-recording code indicating that the recording operation should begin. To terminate the process, the first subscriber inputs an end-recording code or, alternatively, simply hangs up the telephone. The start-recording and end-recording codes are predetermined numbers that are entered by using either dial keys or function buttons on the telephone deskset 17.

Assuming that the first subscriber initiates a conversation with another subscriber through either the same subscriber circuit 16 or office line circuit 10, central processing unit 2 detects when a start-recording code is entered by one of the subscribers. If one of the subscribers initiates the conversation recording process by inputting a start-recording code, the code is supplied to central processing unit 2 via key phone subscriber circuit 16.

Referring now to FIG. 4, a determination is made as to whether the start-recording code has been entered by a subscriber in step 401. Once the code is entered, central processing unit 2 controls switching circuit 8 and conference circuit 24 to begin a three-party conference mode in step 402. The three parties are: (1) the party initiating the recording (i.e. the record requiring subscriber); (2) the party not initiating the recording (i.e. a call-opposite subscriber); and (3) the conversation recording unit 26. Next, in step 403, conference circuit 24 assigns a time slot for the conversation to be recorded.

Also in step 403, a vacant mail box register MB_NO of memory portion 32, which will store the conversation to be recorded, is assigned, and its number is stored. This will enable the system to match a recorded conversation with its corresponding subscriber when the conversation is later played back. In step 404, a start recording address of mail box register MB_NO is sent to address logic portion 44 via third buffer 38. Then, in step 405, memory enable logic portion 42 transfers a write-enable signal to memory portion 32, thereby starting the recording of the conversation. The start recording address of mail box register MB_NO, which is sequentially incremented during recording, is then supplied to memory portion 32 from address logic portion 44. At the same time, voice data from the conversation is supplied to memory portion 32 through serial-to-parallel converter 28 and second buffer 30 from switching circuit 8, thereby recording the conversation. During this time, central processing unit 2 controls time-division assigning circuit 40 through third buffer 38, so that only voice data from the conversation being presently recorded is supplied to memory portion 32 through serial-to-parallel converter 28 and second buffer 30. In step 406, the starting point of the recorded conversation, which is measured by timer circuit 6, is stored in an internal register as the recording start time.

During the recording process, in steps 407 and 408, it is respectively determined whether the subscriber who initiated the recording has either entered an end-recording code or hung up the telephone. If the initiating subscriber has either entered the end-recording code or hung up the telephone, current time data from timer circuit 6 is stored in the internal register as a recording end time in step 409. Then, the recording time is calculated and stored in steps 410 and 411, respectively. The recording time is calculated by subtracting the recording start time stored in step 405 from the recording end time stored in step 409. Storing the recording time enables the system to know the time duration of a specific recorded conversation when it is played back. The recording time is expressed in seconds.

In step 412, the three-party conference mode began in step 402 is terminated by switching the operational mode of the conference circuit 24. Then subsequently, in step 413, the system proceeds to an idle state. Accordingly, the above description illustrates how a conversation between two subscribers is recorded.

In the above description, the recorded conversation was provided from subscribers who were connected to each other within a key phone subscriber circuit 16. The present invention however, also provides for the recording of a conversation between subscribers within a general subscriber circuit 12. In this situation, when the start-recording code is entered from a general telephone (that is, from a telephone 15 connected to general subscriber circuit 12), the central processing unit 2 is not automatically informed of the entry. Therefore, the start-recording code must be entered after a flash-hook procedure is initiated. That is, if during a conversation, the initiating subscriber performs a flash-hook procedure by momentarily depressing the telephone receiver, central processing unit 2 holds the call and connects dual tone multiple frequency receiver 20 to the initiating subscriber through switching circuit 8, thereby enabling the receipt of the start-recording code through dual tone multiple frequency receiver 20. The call placed on hold is restarted when the three-party conference mode is set, as described above in step 402. The process of holding and restarting the call is a well-known technique. Ending the recording process is achieved either by entering an end-recording code after performing a flash-hook procedure using the subscriber's deskset telephone, or simply by hanging up the telephone.

Figure 5:
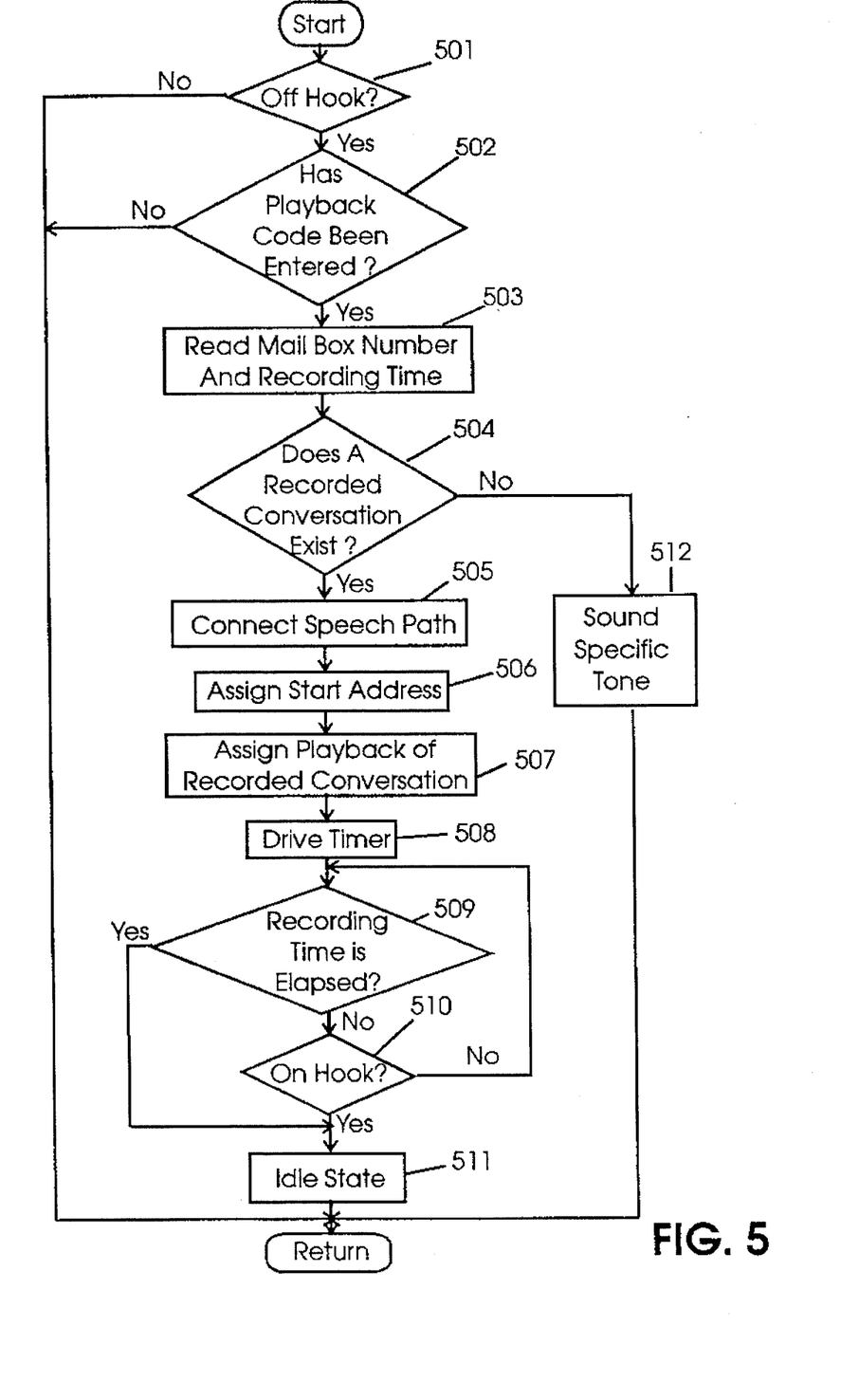
FIG. 5 is a flow chart illustrating the play back of a conversation according to the principles of the present invention.

Referring now to FIG. 5, a flow chart illustrating the conversation playback method according to the principles of the present invention is shown. Hereinafter, the conversation recording operation according to the flow chart of FIG. 5 will be described in detail with reference to FIGS. 1 through 3.

First, when a subscriber among a plurality of subscribers connected to key phone subscriber circuit 16 wants to play back a recorded conversation that is stored in memory portion 32 of conversation recording unit 26, the subscriber enters a playback code via the subscriber's deskset telephone. The playback code is comprised of a predetermined set of numbers that are entered by using dial keys or function buttons on the subscriber's deskset telephone. In step 501, a determination is made whether any subscriber among the plurality of subscribers connected to key phone subscriber circuit 16 has taken his telephone off its hook. If the telephone of a subscriber within the circuit is determined to have been removed from its hook, central processing unit 2 determines in step 502, whether a playback code has been entered from that telephone. If a playback code has been entered, the playback code is supplied to central processing unit 2 through key phone subscriber circuit 16.

Once a playback code is entered by a subscriber, the method proceeds to step 503 where central processing unit 2 reads the number of the mail box register MB_NO and recording time register RD_T corresponding to the subscriber requesting playback from memory unit 4. In step 504, the central processing unit 2 then checks whether a recorded conversation exists for the subscriber requesting playback. If mail box and recording time registers MB_NO and RD_T reflect a value of "FFFF", no recorded conversation exists for that subscriber and the method proceeds to step 512, where a specific tone is transferred to the subscriber indicating that no recorded conversation exists. If, however, a recorded conversation does exist, switching circuit 8 connects, in step 505, a speech path between the subscriber requesting playback and conversation recording unit 26. In step 506, a start address is assigned to mail box register MB_NO of the memory portion 32 through third buffer 38 and address logic portion 44. Then, in step 507, playback of the recorded conversation is commenced by memory enable logic portion 42 read-enabling memory portion 32. Accordingly, memory portion 32, beginning at the start address of mail box register MB_NO, is read from sequentially. During playback, voice data is supplied to switching circuit 8 through parallel-to-serial converter 34 and first buffer 36, providing the recorded conversation to the subscriber requesting playback through key phone subscriber circuit 16. Playback is further enabled by central processing unit 2's control of time-division assignment circuit 40 through third buffer 39. This assures that voice data being played back corresponds only to the time slot allocated for the subscriber requesting playback.

While the recorded conversation is played back and provided to the subscriber requesting playback as described above, an internal timer is driven in step 508. The timer is monitored during the playback process, and it is determined in step 509 whether the recording time has elapsed. Similarly, in step 510, a determination is made as to whether the subscriber requesting playback has hung up his telephone. If either the recording time elapses or the subscriber requesting playback is found to have hung up his telephone, playback is terminated and the system proceeds to an idle state in step 511. Accordingly, the above description illustrates how a recorded conversation between two subscribers can be reproduced during play back.

In the above description, the conversation reproduced during play back was provided from subscribers who were connected to each other within a key phone subscriber circuit 16. The present invention also provides for the playback of a conversation between subscribers within a general subscriber circuit 12. In this situation, the playback code is entered from a general telephone subscriber 15 after a flash-hook procedure is initiated. That is, if the subscriber requesting playback performs a flash-hook procedure by momentarily depressing the telephone receiver, central processing unit 2 connects dual tone multiple frequency receiver 20 to the subscriber requesting playback through switching circuit 8, thereby enabling receipt of the playback code through dual tone multiple frequency receiver 20. Switching circuit 8 then connects the speech path between the subscriber requesting playback and the conversation recording unit 26.

In the above descriptions, the present invention has been applied to a key phone system and a general telephone system. It should be acknowledged that this invention can be similarly applied to either a private switching system or to a central office switching system.

In summary, the present invention records and plays back a conversation between subscribers in a telephone system when a subscriber performs the specific steps disclosed above. While preferred embodiments have been disclosed, it is acknowledged that slight variations of the above system can be made by those skilled in the art without departing from the spirit and scope of the present invention.

What is claimed is:

1. A conversation recording method in a key phone system comprising a timer circuit for generating time data indicative of a current time, a conversation recording unit for recording voice data and time data from a conversation between two subscribers within said key phone system, and a conference circuit for establishing a call among said two subscribers and said conversation recording unit, said method comprising the steps of:

establishing said call among a first subscriber that enters a start-recording code, a second subscriber connected to said first subscriber via a telephone line within said key phone system, and said conversation recording unit, said call established in response to entry of said start-recording code by said first subscriber;

selecting one of a plurality of memory units within said conversation recording unit that corresponds to said first subscriber to store first voice data from a conversation between said first subscriber and said second subscriber and first time data representative of a time duration of said conversation between said first subscriber and said second subscriber;

recording said first voice data from said conversation between said first subscriber and said second subscriber in said one of said plurality of memory units within said conversation recording unit that corresponds to said first subscriber;

ending recording of said conversation between said first subscriber and said second subscriber in response to an end-recording code entered by said first subscriber;

recording said first time data representative of said time duration of said conversation between said first subscriber and said second subscriber in said one of said plurality of memory units within said conversation recording unit that corresponds to said first subscriber; and then terminating said call.

2. The conversation recording method as claimed in claim 1, wherein said step of ending recording of said conversation between said first subscriber and said second subscriber is further performed in response to hanging up a handset of a telephone corresponding to said first subscriber.

3. A conversation playback method in a key phone system comprising a conversation recording unit for recording and playing back voice data from recorded conversations between subscribers within said key phone system, said method comprising the steps of:

determining whether a recorded conversation corresponding to a first subscriber requesting playback exists when said first subscriber removes a handset of a telephone within said key phone system from its hook and enters a playback code;

transferring a message to said first subscriber indicating that no said recorded conversation corresponding to said first subscriber exists when no said recorded conversation corresponding to said first subscriber exists;

playing back said recorded conversation corresponding to said first subscriber from said conversation recording unit while checking whether a time duration of said recorded conversation corresponding to said first subscriber has elapsed when said recorded conversation corresponding to said first subscriber exists; and ending playback of said recorded conversation corresponding to said first subscriber when said time duration of said recorded conversation corresponding to said first subscriber has elapsed.

4. The conversation playback method as claimed in claim 3, wherein said ending playback step is further performed when said first subscriber hangs up the handset of the telephone.

5. A conversation recording/playback method in a key phone system comprising a timer circuit for generating time data indicative of a current time, a conference circuit for establishing a call, and a conversation recording unit for recording and playing back voice data from conversations between subscribers within said key phone system, said method comprising the steps of:

establishing said call among a first subscriber that enters a start-recording code, a second subscriber connected to said first subscriber via a telephone line within said key phone system, and said conversation recording unit, said call established in response to entry of said start-recording code by said first subscriber;

recording first voice data from a conversation between said first subscriber and said second subscriber in said conversation recording unit;

ending recording of said conversation between said first subscriber and said second subscriber in response to an end-recording code entered by said first subscriber;

storing a recording time indicative of a first time duration of said conversation between said first subscriber and said second subscriber in said conversation recording unit, and then terminating said call;

determining whether a recorded conversation corresponding to a third subscriber within said key phone system requesting playback exists in said conversation recording unit when said third subscriber removes a telephone within said key phone system corresponding to said third subscriber from its hook and enters a playback code;

transferring a message to said third subscriber indicating that no said recorded conversation corresponding to said third subscriber exists when no said recorded conversation corresponding to said third subscriber exists in said conversation recording unit;

playing back said recorded conversation corresponding to said third subscriber from said conversation recording unit while checking whether a second time duration of said recorded conversation corresponding to said third subscriber has elapsed when said recorded conversation corresponding to said third subscriber exists in said conversation recording unit; and ending playback of said recorded conversation corresponding to said third subscriber when said second time duration of said recorded conversation corresponding to said third subscriber has elapsed.

6. The conversation recording/playback method as claimed in claim 5, wherein said step of ending recording of said conversation between said first subscriber and said second subscriber is further performed in response to said first subscriber hanging up a handset of a telephone within said key phone system corresponding to said first subscriber.

7. The conversation recording/playback method as claimed in claim 6, wherein said step of ending playback of said recorded conversation corresponding to said third subscriber is further performed in response to said third subscriber hanging up a handset of the telephone within said key phone system corresponding to said third subscriber.

8. A conversation recording method in a system comprising a timer circuit for generating time data indicative of a current time, a conference circuit for establishing a call and a conversation recording unit having voice memory means divided into a plurality of memory regions corresponding respectively to a plurality of subscribers within said system, each one of said plurality of memory regions having a separate mail box register for storing voice data from a recorded conversation between two of said plurality of subscribers within said system and recording time register for storing time data from the recorded conversation, said method comprising the steps of:

establishing said call among a first subscriber that enters a start-recording code, a second subscriber connected to said first subscriber via a telephone line within said system, and said conversation recording unit, said call established in response to entry of said start-recording code by said first subscriber;

assigning a first mail box register and a first recording time register to said first subscriber and storing an identification number corresponding to said first mail box register and said first recording time register, said first mail box register for storing first voice data from a conversation between said first subscriber and said second subscriber via said telephone line, said first recording time register for storing first time data representative of a time duration of said conversation between said first subscriber and said second subscriber;

assigning a start recording address indicating a beginning point within said voice memory means of the conversation between said first subscriber and said second subscriber, storing said first voice data from said conversation between said first subscriber and said second subscriber in said first mail box register and detecting a record start time indicating a time when recording of said conversation between said first subscriber and said second subscriber began;

ending the recording of said conversation between said first subscriber and said second subscriber in response to an end-recording code entered by said first subscriber, detecting a record end time indicating a time when the recording of said conversation between said first subscriber and said second subscriber ends, and storing said first time data representative of the time duration of the conversation between said first subscriber and said second subscriber in said first recording time register; and then terminating said call and driving said conversation recording unit to an idle state.

9. The conversation recording method as claimed in claim 8, wherein said step of ending the recording of said conversation between said first subscriber and said second subscriber is further performed in response to said first subscriber hanging up a handset of a telephone corresponding to said first subscriber.

10. A conversation playback method in a system comprising conversation recording unit having voice memory means divided into a plurality of memory regions corresponding respectively to a plurality of subscribers within said system, each one of said plurality of memory regions having a separate mail box register and recording time register for storing voice data from a recorded conversation and a time duration of the recorded conversation, respectively, said conversation recording unit also playing back stored voice data, and memory means for storing an identification number corresponding to each said mail box register and said recording time register of each one of said plurality of subscribers within said system, said method comprising the steps of:

reading a first number corresponding to a first mail box register and a first recording time register corresponding to a first subscriber requesting playback when said first subscriber removes a handset of a telephone corresponding to said first subscriber from its hook and enters a playback code;

determining whether a first recorded conversation corresponding to said first subscriber exists after reading said first mail box register and said first recording time register;

informing said first subscriber that said first recorded conversation corresponding to said first subscriber does not exist when said first mail box register and said first recording time register indicate initial values;

connecting a speech path via a telephone line within said system between said first subscriber and said conversation recording unit when said first mail box register and said first recording time register do not indicate initial values;

detecting a start recording address indicating a beginning point of said first recorded conversation within said voice memory means, playing said first recorded conversation back to said first subscriber via said telephone line while driving a timer and checking whether a first time duration of said first recorded conversation elapses;

ending playback of said first recorded conversation when said first time duration of said first recorded conversation elapses; and then driving said conversation recording unit to an idle state.

11. The conversation playback method as claimed in claim 10, wherein said step of ending playback of said first recorded conversation is further performed in response to said first subscriber hanging up the handset of the telephone corresponding to said first subscriber.

12. A conversation recording/playback method in a system comprising a timer circuit for generating time data indicative of a current time, a conference circuit for establishing a call, a conversation recording unit having voice memory means divided into a plurality of memory regions corresponding respectively to a plurality of subscribers within said system, each one of said plurality of memory regions having a separate mail box register and recording time register for storing voice data from a recorded conversation and a time duration of the recorded conversation, respectively, said conversation recording unit also playing back stored voice data, and memory means for storing an identification number corresponding to each said mail box register and said recording time register of each one of said plurality of subscribers within said system, said method comprising the steps of:

establishing said call among a first subscriber that enters a start-recording code, a second subscriber connected to said first subscriber via a telephone line within said system, and said conversation recording unit, said call established in response to entry of said start-recording code by said first subscriber;

assigning a first mail box register and a first recording time register to said first subscriber and storing a first identification number corresponding to said first mail box register and said first recording time register, said first mail box register for storing first voice data from a conversation between said first subscriber and said second subscriber via said telephone line, said first recording time register for storing a first recording time indicating a time duration of said conversation between said first subscriber and said second subscriber;

assigning a start recording address indicating a beginning point of the conversation between said first subscriber and said second subscriber within said voice memory means, storing said first voice data from said conversation between said first subscriber and said second subscriber in said first mail box register and detecting a record start time indicating a time when recording of said conversation between said first subscriber and said second subscriber began;

ending the recording of said conversation between said first subscriber and said second subscriber in response to an end-recording code entered by said first subscriber, detecting a record end time indicating a time when the recording of said conversation between said first subscriber and said second subscriber ends, and storing said first recording time indicating the time duration of the conversation between said first subscriber and said second subscriber in said first recording time register;

terminating said call and driving said conversation recording unit to an idle state;

reading said first identification number corresponding to said first mail box register and said first recording time register when said first subscriber removes a handset of a telephone corresponding to said first subscriber from its hook and enters a playback code;

determining whether said conversation between said first subscriber and said second subscriber exists after reading said first mail box and said first recording time register;

connecting a speech path via said telephone line between said first subscriber and said conversation recording unit;

detecting said start recording address indicating said beginning point of the conversation between said first subscriber and said second subscriber within said voice memory means, playing said conversation between said first subscriber and said second subscriber back to said first subscriber via said telephone line while driving a timer and checking whether the time duration of the conversation between said first subscriber and said second subscriber elapses;

ending playback of the conversation between said first subscriber and said second subscriber when said time duration of the conversation between said first subscriber and said second subscriber elapses; and then driving said conversation recording unit to said idle state.

13. The conversation recording/playback method as claimed in claim 12, wherein said step of ending the recording of said conversation between said first subscriber and said second subscriber is further performed in response to said first subscriber hanging up the handset of the telephone corresponding to said first subscriber.

14. The conversation recording/playback method as claimed in claim 12, wherein said step of ending playback of said conversation between said first subscriber and said second subscriber is further performed in response to said first subscriber hanging up the handset of the telephone corresponding to said first subscriber.

15. A conversation recording method in a system comprising a timer circuit for generating time data indicative of a current time, a conference circuit for establishing a call and a conversation recording unit having voice memory means divided into a plurality of memory regions corresponding respectively to a plurality of subscribers within said system, each one of said plurality of memory regions having a separate mail box register and recording time register for storing voice data from a recorded conversation and time data from the recorded conversation, respectively, said method comprising the steps of:

placing said call between a first subscriber and a second subscriber via a telephone line within said system on hold in response to a flash-hook procedure performed by said first subscriber momentarily depressing a receiver button on a telephone corresponding to said first subscriber;

establishing said call among said first subscriber, said second subscriber connected to said first subscriber via said telephone line, and said conversation recording unit, said call established in response to entry of a start-recording code by said first subscriber after the flash-hook procedure is performed;

restarting said call between said first subscriber and said second subscriber;

assigning a first mail box register and a first recording time register to said first subscriber and storing an identification number corresponding to said first mail box register and said first recording time register, said first mail box register for storing first voice data from a conversation between said first subscriber and said second subscriber occuring during said call between said first subscriber and said second subscriber, said first recording time register for storing first time data representative of a time duration of the conversation between said first subscriber and said second subscriber;

assigning a start recording address indicating a beginning point of the conversation between said first subscriber and said second subscriber within said voice memory means, storing said first voice data from said conversation between said first subscriber and said second subscriber in said first mail box register, and detecting a record start time indicating a time when recording of said conversation between said first subscriber and said second subscriber began;

ending the recording of said conversation between said first subscriber and said second subscriber in response to an end-recording code entered by said first subscriber, detecting a record end time indicating a time when the recording of said conversation between said first subscriber and said second subscriber ends, and storing said first time data representative of the time duration of the conversation between said first subscriber and said second subscriber in said first recording time register; and then     terminating said call and driving said conversation recording unit to an idle state.

16. The conversation recording method as claimed in claim 15, wherein said step of ending the recording of said conversation between said first subscriber and said second subscriber is further performed in response to said first subscriber hanging up a handset of the telephone corresponding to said first subscriber.

17. A conversation playback method in a system comprising a conversation recording unit having voice memory means divided into a plurality of memory regions corresponding respectively to a plurality of subscribers within said system, each one of said plurality of memory regions having a separate mail box register and recording time register for storing voice data from a recorded conversation and a time duration of the recorded conversation, respectively, said conversation recording unit also playing back stored voice data, and memory means for storing an identification number corresponding to each said mail box register and said recording time register of each one of said plurality of subscribers within said system, said method comprising the steps of:

reading a first identification number corresponding to a first mail box register and a first recording time register of a first subscriber requesting playback when said first subscriber removes a handset of a telephone corresponding to said first subscriber from its hook, performs a flash-hook procedure by momentarily depressing a receiver button on the telephone and enters a playback code;

determining whether a first recorded conversation corresponding to said first subscriber exists after reading said first mail box register and said first recording time register;

informing said first subscriber that said first recorded conversation does not exist when said first mail box register and said first recording time register indicate initial values;

connecting a speech path via a telephone line within said system between said first subscriber and said conversation recording unit when said first mail box register and said first recording time register do not indicate initial values;

detecting a start recording address indicating a beginning point of the first recorded conversation within said voice memory means, playing said first recorded conversation back to said first subscriber via said telephone line while driving a timer and checking whether a first time duration of the first recorded conversation elapses;

ending playback of the first recorded conversation when said first time duration of the first recorded conversation elapses; and then     driving said conversation recording unit to an idle state.

18. The conversation playback method as claimed in claim 17, wherein said step of ending playback of said first recorded conversation is further performed in response to said first subscriber hanging up the handset of the telephone corresponding to said first subscriber.

19. An apparatus for recording and playing back conversations between subscribers in a system, said apparatus comprising:

a conversation recording unit having voice memory means divided into a plurality of memory regions corresponding respectively to a plurality of the subscribers within said system, each one of said plurality of memory regions comprising a mail box register for storing voice data from conversation corresponding to an individual one of the subscribers and a recording time register for storing a time duration of the conversation corresponding to said individual one of the subscribers;

a timer circuit for generating time data indicative of a current time, said timer circuit measuring time durations of the conversations between the subscribers; and     a conference circuit for establishing calls among first subscribers who initiate recording of the conversations, second subscribers who are speaking with corresponding said first subscribers via telephone lines in said system, and said conversation recording unit.

20. The apparatus as claimed in claim 19, wherein said voice memory means is partitioned such that each said mail box register and recording time register comprises an equal amount of data storage space.

21. The apparatus as claimed in claim 20, wherein said conversation recording unit further comprises:
- serial-to-parallel conversion means for converting the voice data into parallel data;
- buffer means for receiving said parallel data from said serial-to-parallel conversion means, temporarily storing said parallel data, and then supplying said parallel data to said voice memory means;
- parallel-to-serial conversion means for receiving said parallel data from said voice memory means and converting said parallel data into serial data;
- time-division assigning means for assigning time slots for the parallel and serial data converted by said serial-to-parallel conversion means and said parallel-to-serial conversion means, respectively, said time slots being assigned in response to a plurality of control signals; and
- memory enable logic means for selectively enabling one of a read operation and a write operation of said voice memory means in response to said plurality of control signals.

22. An apparatus for recording and playing back conversations between subscribers within a phone system, said apparatus comprising:
- a conversation recording unit having voice memory means divided into a plurality of memory regions corresponding respectively to a plurality of the subscribers within said phone system, each one of said plurality of memory regions comprising a mail box register for storing voice data from a conversation corresponding to an individual one of the subscribers and a recording time register for storing a time duration of the conversation corresponding to said individual one of the subscribers, said conversation recording unit further comprising:
  - serial-to-parallel conversion means for converting the voice data into parallel data;
  - buffer means for receiving said parallel data from said serial-to-parallel conversion means, temporarily storing said parallel data, and then supplying said parallel data to said voice memory means;
  - parallel-to-serial conversion means for receiving said parallel data from said voice memory means and converting said parallel data into serial data;
  - time-division assigning means for assigning time slots for the parallel and serial data converted by said serial-to-parallel conversion means and said parallel-to-serial conversion means, respectively, said time slots being assigned in response to a plurality of control signals; and
  - memory enable logic means for selectively enabling one of a read operation and a write operation of said voice memory means in response to said plurality of control signals;
- a timer circuit for generating time data indicative of a current time, said timer circuit measuring time durations of the conversations between the subscribers; and
- a conference circuit for establishing calls among first subscribers who initiate recording of the conversations, second subscribers who are speaking with corresponding said first subscribers via telephone lines in said phone system, and said conversation recording unit.

* * * * *